(12) United States Patent
Kearney et al.

(10) Patent No.: US 10,752,082 B1
(45) Date of Patent: Aug. 25, 2020

(54) CLIMATE CONTROL SYSTEM WITH SLIT-VENT FLUID DELIVERY

(71) Applicants: John M. Kearney, San Mateo, CA (US); Clarisse Mazuir, San Jose, CA (US); Arthur Y. Zhang, San Jose, CA (US); Samuel B. Schaevitz, Los Gatos, CA (US)

(72) Inventors: John M. Kearney, San Mateo, CA (US); Clarisse Mazuir, San Jose, CA (US); Arthur Y. Zhang, San Jose, CA (US); Samuel B. Schaevitz, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 323 days.

(21) Appl. No.: 15/606,179

(22) Filed: May 26, 2017

Related U.S. Application Data

(60) Provisional application No. 62/341,687, filed on May 26, 2016.

(51) Int. Cl.
*B60H 1/24* (2006.01)
*B60H 1/00* (2006.01)

(52) U.S. Cl.
CPC ....... *B60H 1/00685* (2013.01); *B60H 1/0025* (2013.01); *B60H 1/00028* (2013.01); *B60H 1/00035* (2013.01); *B60H 1/00007* (2013.01); *B60H 1/00021* (2013.01); *B60H 1/00642* (2013.01); *B60H 1/00664* (2013.01); *B60H 1/00671* (2013.01); *B60H 2001/00092* (2013.01); *B60H 2001/00114* (2013.01); *B60H 2001/00721* (2013.01)

(58) Field of Classification Search
CPC ............ B60H 1/00564; B60H 1/00835; B60H 1/00871; B60H 1/00985; B60H 1/242; B60H 1/247; B60H 1/3407; B60H 1/3414
USPC ......... 454/121, 125, 93, 152–153, 156, 158, 454/159
See application file for complete search history.

(56) References Cited

U.S. PATENT DOCUMENTS

| | | | | |
|---|---|---|---|---|
| 3,101,038 | A * | 8/1963 | Archer | F24F 13/078 454/295 |
| 5,599,229 | A * | 2/1997 | Claunch | D21F 5/18 34/492 |
| 6,942,563 | B2 | 9/2005 | Pesch et al. | |
| 6,966,829 | B1 * | 11/2005 | Hier | B60H 1/247 454/152 |
| 8,641,489 | B2 * | 2/2014 | Dubief | B60H 1/0055 454/127 |
| 2004/0072532 | A1 * | 4/2004 | Cho | B60H 1/3414 454/155 |
| 2007/0046452 | A1 * | 3/2007 | Anderson, Jr. | B60H 1/00985 340/449 |

(Continued)

*Primary Examiner* — Vivek K Shirsat
*Assistant Examiner* — Ko-Wei Lin
(74) *Attorney, Agent, or Firm* — Young Basile Hanlon & MacFarlane, P.C.

(57) ABSTRACT

A climate control system includes a fluid delivery module. The fluid delivery module includes a housing defining a fluid flow path between an inlet and an outlet with the outlet having an elongated, slit-like shape and is not visible within a sight line of a user. The fluid delivery module further includes a fluidic control device disposed within the housing between the inlet and the outlet and movable to vary a direction of the fluid flow path within the housing.

20 Claims, 5 Drawing Sheets

(56) References Cited

U.S. PATENT DOCUMENTS

| | | | |
|---|---|---|---|
| 2008/0254734 A1* | 10/2008 | Uenaka | F24F 1/0007 454/256 |
| 2008/0314061 A1* | 12/2008 | Nagami | B60H 1/00378 62/244 |
| 2009/0036046 A1* | 2/2009 | Gehring | B60H 1/3407 454/137 |
| 2009/0093206 A1* | 4/2009 | Okita | B60H 1/247 454/143 |
| 2010/0124876 A1* | 5/2010 | Yu | B60H 1/3428 454/155 |
| 2010/0323603 A1* | 12/2010 | Lans | E06B 7/02 454/196 |
| 2014/0179212 A1* | 6/2014 | Space | B60N 2/565 454/76 |
| 2015/0224853 A1 | 8/2015 | Errick et al. | |

\* cited by examiner

CLIMATE CONTROL SYSTEM WITH SLIT-VENT FLUID DELIVERY

CROSS-REFERENCE TO RELATED APPLICATION(S)

This application claims priority to U.S. Provisional Application Ser. No. 62/341,687, filed May 26, 2016, and entitled "Climate Control System with Slit-Vent Fluid Delivery," the contents of which are incorporated herein by reference.

FIELD

This disclosure relates generally to the field of vehicle climate control systems. More particularly, the disclosure relates to a low-profile, slit-vent fluid delivery module leveraging internal fluidic control devices to vary a fluid delivery profile.

BACKGROUND

Vehicle climate control systems are designed to change environmental conditions such as humidity and temperature within a vehicle cabin. Many climate control systems adjust environmental conditions by providing thermally conditioned fluid, generally air, to the vehicle cabin using a series of ducts, outlets, and user-manipulated directional control devices. For example, many climate control systems include manually-adjustable vanes or registers positioned across rectangular duct outlets located on interior surfaces such as the instrument panel or the center console within the vehicle. These outlet and vane combinations use a large amount of space within the vehicle and grant a limited amount of fluid delivery control to the user.

SUMMARY

The disclosure relates to fluid delivery modules and climate-control methods. In one aspect of the disclosure, a fluid delivery module includes a housing defining a fluid flow path between an inlet and an outlet. The outlet has a slit-like shape and is not visible within a sight line of a user. The fluid delivery module further includes a fluidic control device disposed within the housing between the inlet and the outlet. The fluidic control device is movable to vary a direction of the fluid flow path within the housing.

In another aspect of the disclosure, a climate-control method includes receiving information associated with a fluid delivery profile based on a user input at a control unit and sending, from the control unit, a command to modify movement of a fluidic control device within a fluid delivery module based on the fluid delivery profile. The fluid delivery profile defines a pattern of fluid flow exiting an outlet of the fluid delivery module.

In another aspect of the disclosure, the fluid delivery module includes a housing defining a fluid flow path between an inlet and an outlet, a fluidic control device disposed within the housing between the inlet and the outlet and movable to vary a direction of the fluid flow path within the housing according to a fluid delivery profile, and an outlet treatment disposed proximate to the outlet and comprising at least one of a porous material covering the outlet, a shutter device movable to alter a cross-sectional area of the outlet, or a lighting feature masking visibility of the outlet from a location outside the housing.

BRIEF DESCRIPTION OF THE DRAWINGS

The disclosure is best understood using the following detailed description in conjunction with the accompanying drawings. Similar reference numerals in the drawings designate similar elements. Note that the dimensions of the various features can be expanded or reduced for clarity.

DETAILED DESCRIPTION

A fluid delivery module with a slit-vent, low-profile outlet providing fluid flow according to a variety of fluid delivery profiles controlled by user input is described. The fluid delivery module includes a housing defining a fluid flow path between an inlet and the slit-vent, low-profile outlet, The outlet is generally not visible to the user based on a location of the outlet in respect to other components within a sight line of the user, a shape and size of the outlet, or use of various outlet treatments to hide the outlet from view. The housing includes one or more fluidic control devices movable to vary a direction of the fluid flow path within the housing in order to implement the fluid delivery profiles. The fluid can be a gas and/or a liquid. Examples of the fluid include air, water, and scented media such as oil, the provision of each being controlled in content and direction in order to meet the desired fluid delivery profile.

Figure 1:
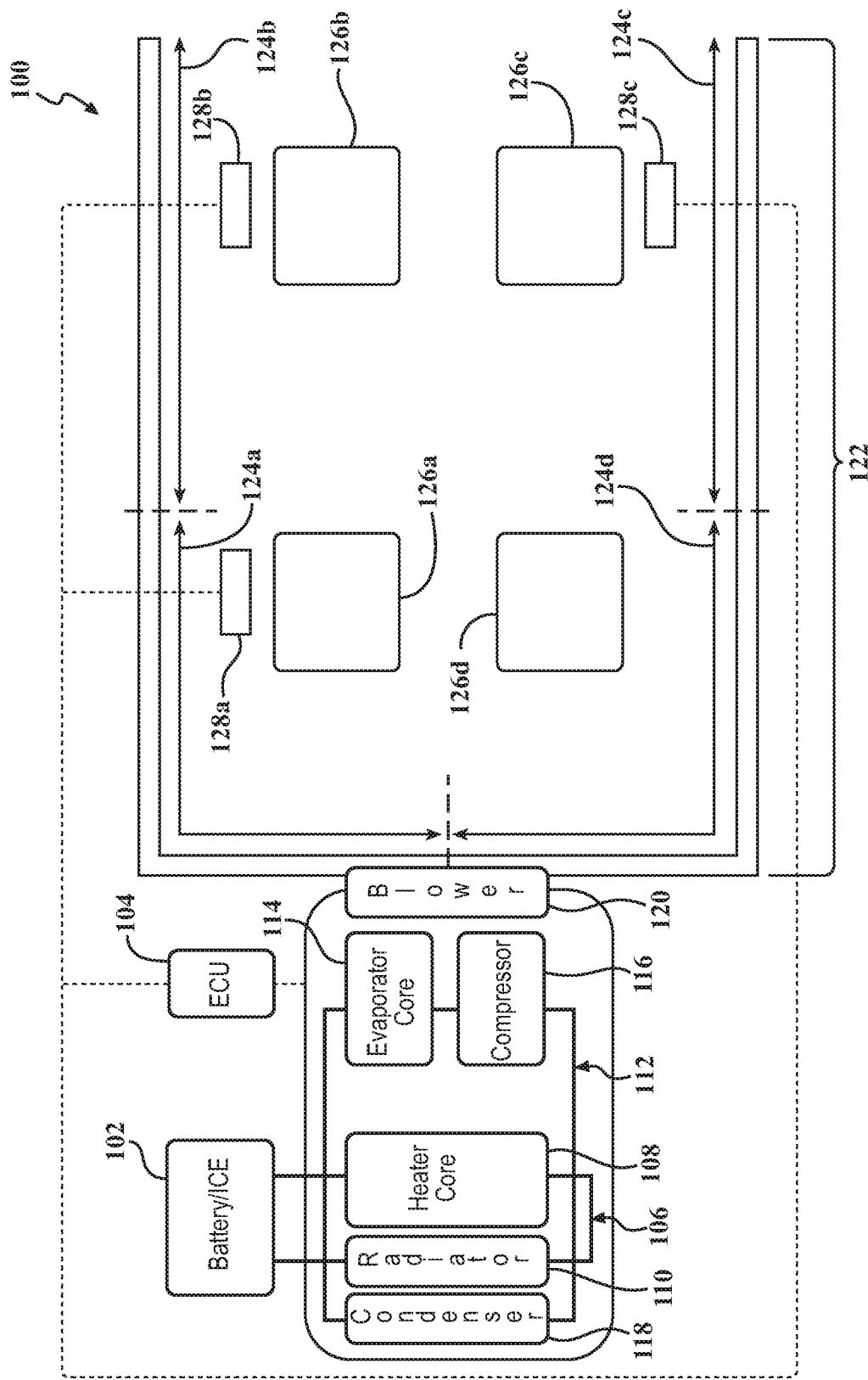
FIG. 1 shows a schematic view of a climate control system for a vehicle.

FIG. 1 shows a schematic view of a climate control system usable, for example, with a vehicle 100. The vehicle 100 can include a power unit, a thermal transfer module, and a control unit. The power unit can be an internal combustion engine and/or a battery 102 that provides both heat and power to the thermal transfer module, the control unit, and/or any other components or systems within the vehicle 100 that require electrical energy or thermal conditioning to operate. The control unit can be an ECU 104 configured to control the various components of the thermal transfer module.

The thermal transfer module can include a heating module 106. The heating module 106 can include the battery 102, a heating element, such as a heater core 108, and a cooling element, such as a radiator 110. The heating module 106 can circulate a working fluid, such as a glycol-based coolant, between the battery 102, the heater core 108, and the radiator 110 to generate heat for the heating module 106. Other examples of working fluids include water and air. The working fluid is separate from the fluid flow delivered to a user as described in additional detail below, as the working fluid is generally used to thermally condition the fluid flow.

The thermal transfer module can also include a cooling module 112. The cooling module 112 can include cooling elements such as an evaporator core 114, a compressor 116, and a condenser 118 that function in a traditional manner, for example, as a vehicle-based air conditioner. The cooling module 112 can circulate a second working fluid, such as refrigerant, between the evaporator core 114, the compressor 116, and the condenser 118 to generate cooling for the cooling module 112. Again, the second working fluid is separate from the fluid flow delivered to the user, as the second working fluid is also generally used to thermally condition the fluid flow.

The thermal transfer module can also include a blower 120 and a fluid delivery module 122. The blower 120 can draw the fluid delivered to the user, such as air or water in the case of added humidity, through the heater core 108 and the evaporator core 114 in order to thermally condition the fluid entering the fluid delivery module 122. The fluid delivery module 122, though shown here only schematically, can be designed to direct the conditioned fluid to various locations within the vehicle 100. In one example, the fluid delivery module 122 can be divided into portions or zones 124*a-d* with each of the zones 124*a-d* covering only some portion of the fluid delivery module 122. Each zone 124*a-d* can be located proximate to one of the seats 126*a-d* within the vehicle 100. Though four zones 124*a-d* of the fluid delivery module 122 are shown in FIG. 1 as generally aligned with the seats 126*a-d* in the vehicle 100, additional zones can be positioned at a variety of locations in the vehicle 100 to supply the conditioned fluid.

Each of the zones 124*a-d* can include at least one low-profile outlet for the fluid delivery module 122, with the outlet being hidden from view based on a location of the outlet in respect to other components within the vehicle. In other words, the outlet is not visible in respect to user sight lines. For example, in the zones 124*a* and 124*d*, the outlet of the fluid delivery module 122 can be located along a lower portion of an instrument panel such that an upper portion of the instrument panel hides the outlet from view of the seats 126*a* and 126*d*. In another example, applicable to all of the zones 124*a-d*, the outlet of the fluid delivery module 122 can be located along a belt line of the door such that a trim component hides the outlet from view of the seats 126*a-d*. Other locations for the outlet include within a foot well, along a roof line, hidden by a trim component of the headliner, etc. The examples of components that block the outlet from view are non-limiting.

The ECU 104 can be used to control the heating module 106, the cooling module 112, the blower 120, and the fluid delivery module 122 to condition and deliver fluid according to a fluid delivery profile that is determined based on a user input to the climate control system. For example, users located in the seats 126*a-c* can each possess a mobile device 128*a-c*. The mobile devices 128*a-c* can include interfaces allowing the respective user to select, for example, a fluid delivery profile for the user's respective zone 124*a-c* that dictates the speed/intensity, temperature, flow pattern, types of fluid such as air, water, or scented oil, and/or overall direction of the fluid being delivered to the user by the fluid delivery module 122 in the respective zone 124*a-c*.

In another example, the fluid delivery profile can be determined automatically by the ECU 104 in order to provide specific fluid types, temperatures, speeds/intensities, humidity levels, flow patterns, etc. within the vehicle 100. Other means of selecting the fluid delivery profile are also possible, such as by an input received through an interface (not shown) within the vehicle 100 or data provided to the ECU 104 by sensors (not shown) located throughout the vehicle 100. The fluid delivery module 122 can also include fluidic control devices used to adjust the direction, flow rate, flow pattern, etc. of fluid provided from each zone 124*a-d* without impacting other zones 124*a-d*.

Details of various embodiments of the fluid delivery module 122 and the fluidic control devices are described in reference to FIGS. 2-6 below. The ECU 104 can be implemented to control the heating module 106, the cooling module 112, the blower 120, the fluid delivery module 122, and the fluidic control devices as described with respect to a computing device further detailed in FIG. 7. Though rotatable fluidic control devices are described in reference to FIGS. 2-6 below, other types of fluidic control devices, such as pressure-changing air bladders and shape-changing shape-memory alloy devices can also be used to control a direction of fluid flow within the fluid delivery module 122.

Figure 2:
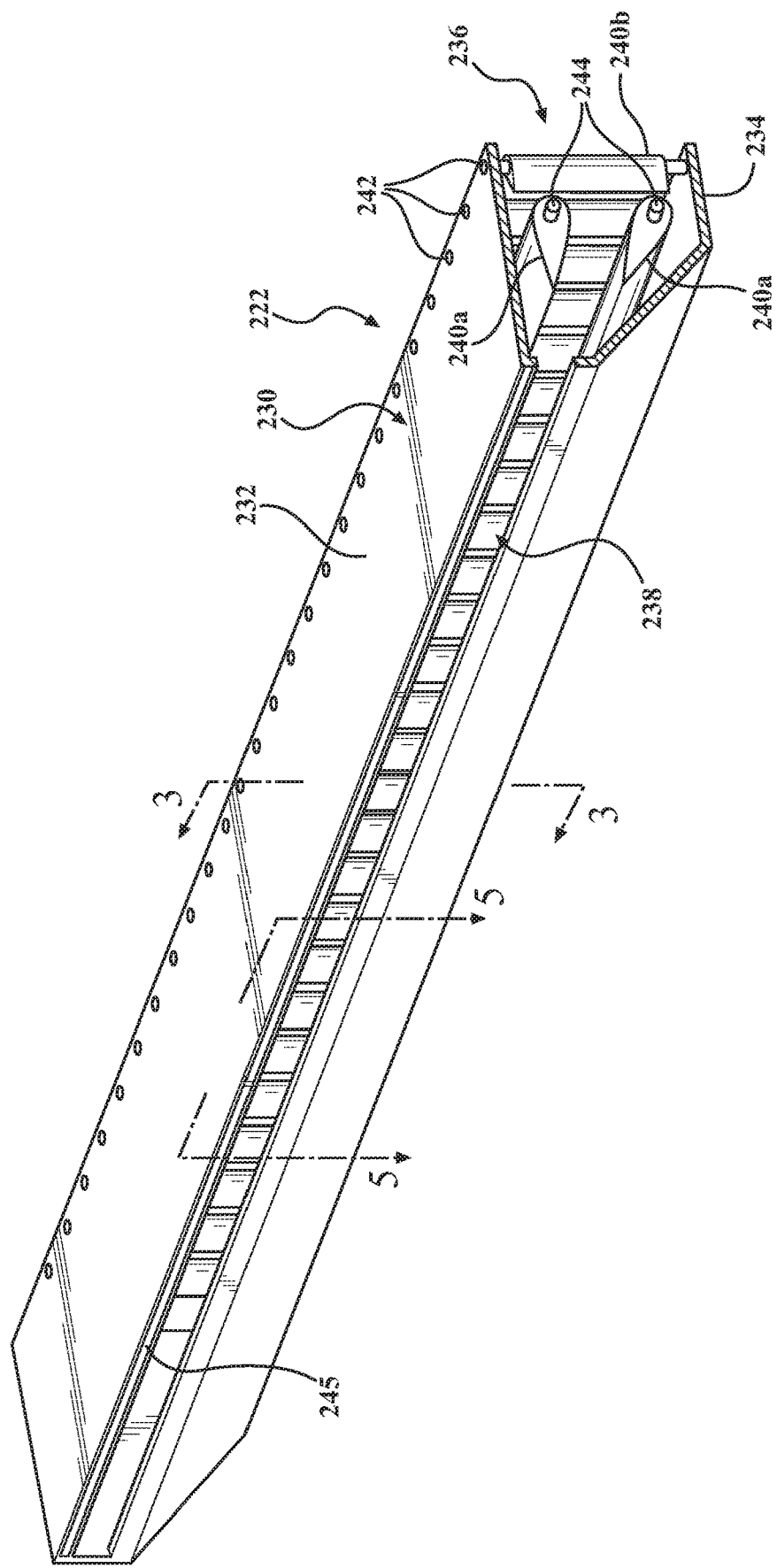
FIG. 2 shows a cutaway front perspective view of a slit-vent fluid delivery module in the climate control system of FIG. 1.

FIG. 2 shows a cutaway front perspective view of a slit-vent fluid delivery module 222 in the climate control system of FIG. 1. The slit-vent fluid delivery module 222 includes a housing 230 comprising a top surface 232 and a bottom surface 234 between which are defined an inlet 236 and an outlet 238. A fluid flow path (further described in the sectional views of FIGS. 3 and 4 below) extends through the housing 230 between the top surface 232 and the bottom surface 234 from the inlet 236 to the outlet 238. Two types of fluidic control devices 240*a-b* are disposed within the housing 230 between the inlet 236 and the outlet 238.

The inlet 236 in the example of FIG. 2 has a generally rectangular shape, and a width of the inlet 236 can be generally equivalent to a width of the outlet 238. A height of the inlet 236 can be greater than a height of the outlet 238. In one example, a cross-sectional area of the inlet 236 (here, the height multiplied by the width) can be at least an order of magnitude greater than a cross-sectional area of the outlet 238. The outlet 238 in the example of FIG. 2 has a generally rectangular, slit-like shape in that the width of the outlet 238 is at least an order of magnitude greater than a height of the outlet 238. In one example, the height of the outlet 238 can vary between fifty microns and one centimeter and the width of the outlet 238 (and in this example, the inlet 236) can vary between ten centimeters and several meters.

The tapered shape of the bottom surface 234 of the housing 230 and the difference between the cross-sectional area of the inlet 236 and the outlet 238 are such that an increase in fluid flow speed and a decrease in fluid flow pressure will occur as fluid, for example, humidified air, travels along the fluid flow path between the inlet 236 and the outlet 238. The placement and shape of the top surface 232 and the bottom surface 234 as well as the size and shape of the inlet 236 and the outlet 238 can be modified to control a pressure differential between the inlet 236 and the outlet 238 such that the slit-vent fluid delivery module 222 can be used to provide fluid according to a variety of fluid delivery profiles.

The fluidic control devices 240*a-b* disposed between the inlet 236 and the outlet 238 are movable to vary a direction of the fluid flow path within the housing 230. For example, the fluidic control devices 240*a* that extend from the top surface 232 to the bottom surface 234 near the inlet 236 include pivots 242 around which the fluidic control devices 240*a* can be controlled to rotate. Similarly, the fluidic control devices 240*b* that extend transversely across the housing 230 include pivots 244 around which the fluidic control devices 240*b* can be controlled to rotate. The fluidic control devices 240*a-b* can be rotated to vary the direction of fluid flow along the fluid flow path in order to control fluid delivery from the outlet 238. Operation of the fluidic control devices 240*a-b* can be directed by the ECU 104 of FIG. 1. Additional details and control features of the fluidic control devices 240*a-b* are described in reference to the sectional views of the slit-vent fluid delivery module 222 in FIGS. 3-6 below.

Figure 3:
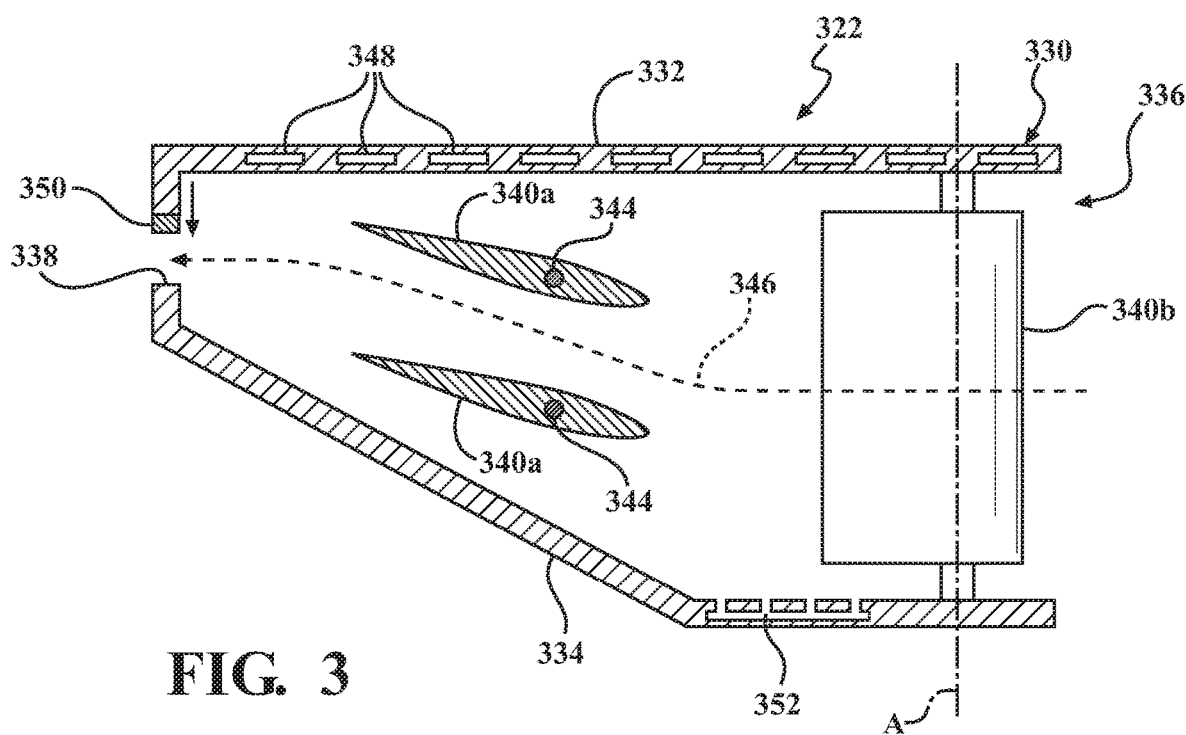
FIG. 3 shows a vertical sectional view through section 3-3 of the slit-vent fluid delivery module of FIG. 2.

FIG. 3 shows a vertical sectional view through section 3-3 of the slit-vent fluid delivery module 222 of FIG. 2. In the FIG. 3 example, a slit-vent fluid delivery module 322 includes a housing 330 having a top surface 332 and a bottom surface 334 defining a fluid flow path 346 generally designated using a dotted line between an inlet 336 and an outlet 338. Two types of fluidic control devices 340a-b are disposed within the housing 330, the transverse fluidic control devices 340a having an airfoil shape and rotatable about pivots 344 and the vertical fluidic control device 340b extending between the top surface 332 and the bottom surface 334 and rotatable about an axis A.

In addition to the outlet 338 having a slit-like shape such that the outlet 338 is generally hidden from view of a user, the transverse fluidic control devices 340a are spaced from the outlet 338 such that movement of the transverse fluidic control devices 340a is not visible to a user through the outlet 338 from a location outside of the housing 330. For example, the transverse fluidic control devices 340a would not be visible to users located in the seats 126a-d of the vehicle 100 of FIG. 1 through the outlet 338 should the outlet 338 be located along an instrument panel, along a door belt line, or along a headliner of the vehicle 100 as non-limiting examples. Lack of visibility of the movement of the transverse fluidic control devices 340a can be based on the location of the transverse fluidic control devices 340a within the housing in respect to the location of the outlet 338, the shape of the top surface 332 and the bottom surface 334 near the outlet 338 as having, for example, a lip or edge, and/or a diminutive height of the outlet 338 that forms the slit-like shape of the outlet 338. Movement of the transverse fluidic control devices 340a can provide a fine level of directional control to the fluid exiting the outlet 338.

The vertical fluidic control device 340b in the example of FIG. 3 is located proximate to the inlet 336. Given the spacing between the outlet 338 and the vertical fluidic control device 340b as well as the location of the vertical fluidic control device 340b upstream of the transverse fluidic control device 340a, the vertical fluidic control device 340b can also be blocked from view of a user through the outlet 338 from a location outside the housing 330. The vertical fluidic control device 340b can provide a coarse level of directional control to the fluid exiting the outlet 338. Movement of both types of fluidic control devices 340a-b can be controlled by a control unit, such as the ECU 104 of FIG. 1, based on an input received, for example, from a user that defines a fluid delivery profile.

Using the coarser directional control of the vertical fluidic control device 340b and the finer directional control of the transverse fluidic control devices 340a in combination with a variation in, for example, fan speeds, fluid delivery profiles of varying patterns can be achieved by the slit-vent fluid delivery module 322. For example, a breeze-style pattern or profile can include generating semi-random or oscillating fluid flow exiting the outlet 338. In another example, an open-window-style or open-sunroof-style pattern or profile can include generating sinusoidal direction changes in the fluid flow exiting the outlet 338 without the need for an open window or an open sunroof in the vehicle 100.

The slit-vent fluid delivery module 322 can also include thermal transfer devices such as thermal passages 348 adjacent to, or as shown in the example of FIG. 3, within the top surface 332. The thermal passages 348 can carry one or more thermally conditioned working fluids, such as water, coolant-based glycol, refrigerant, air, etc. that can heat or cool the fluid flow along the fluid flow path 346 for at least a portion of the slit-vent fluid delivery module 322. Using thermal passages 348 in combination with a main thermal module such as that shown in FIG. 1 allows for general heating and cooling of fluid flow as delivered to the entire slit-vent fluid delivery module 322 and site-specific or zone-specific heating and cooling delivered by portions of the slit-vent fluid delivery module 322 that can be aligned with inputs or fluid delivery profiles selected by various users in the vehicle 100.

The slit-vent fluid delivery module 322 can also include an outlet treatment such as a shutter 350. In addition to hiding the outlet 338 from view of a user by further diminishing a cross-sectional area of the outlet 338, the shutter 350 can be controlled to alter the cross-sectional area of the outlet 338 in order to change the characteristics of the fluid flow exiting the outlet, for example, to generate oscillations or bursts of fluid flow consistent with a breeze-style pattern, an open-window-style pattern, or an open-sunroof-style pattern. Other fluid flow patterns can also be generated based in part of a position of the shutter 350.

Another outlet treatment suitable for use with the slit-vent fluid delivery module 322 to hide visibility of the outlet 338 is a lighting feature (e.g., lighting feature 245 shown in FIG. 2) that can be located proximate to the outlet 338 in order to mask visibility of the outlet 338 from any location or user sight line outside the housing 330. The lighting feature can provide accent lighting or highlighting of certain areas of the vehicle while at the same time making it difficult for users in various positions within the seats 126a-d to see the outlet 338. The lighting feature could also be used to represent characteristics of the fluid flow exiting the outlet 338. Characteristics of fluid flow represented by, for example, different colors or patterns of light can include temperature, speed, fluid type, fluid direction, etc.

The slit-vent fluid delivery module 322 can also include an olfactory passage 352. The olfactory passage 352 can be used to deliver scented fluid such as scented oil in the form of a mist to the fluid flow path 346 according to the fluid delivery profile. For example, the fluid delivery profile selected by a user can be an ocean-breeze profile. In this example, the fluidic control devices 340a-b can move in a pattern to deliver a breeze-like fluid flow through the outlet 338 and the olfactory passage 352 can be used to infuse the main fluid, in this case, air, with scented oils or other fluids that give the impression of salt, sand, or sea creature to the user. In other examples, other scents, such as bonfires, evergreen trees, spring flowers, etc. can be associated with other fluid-delivery profiles selectable by a user.

Figure 4:
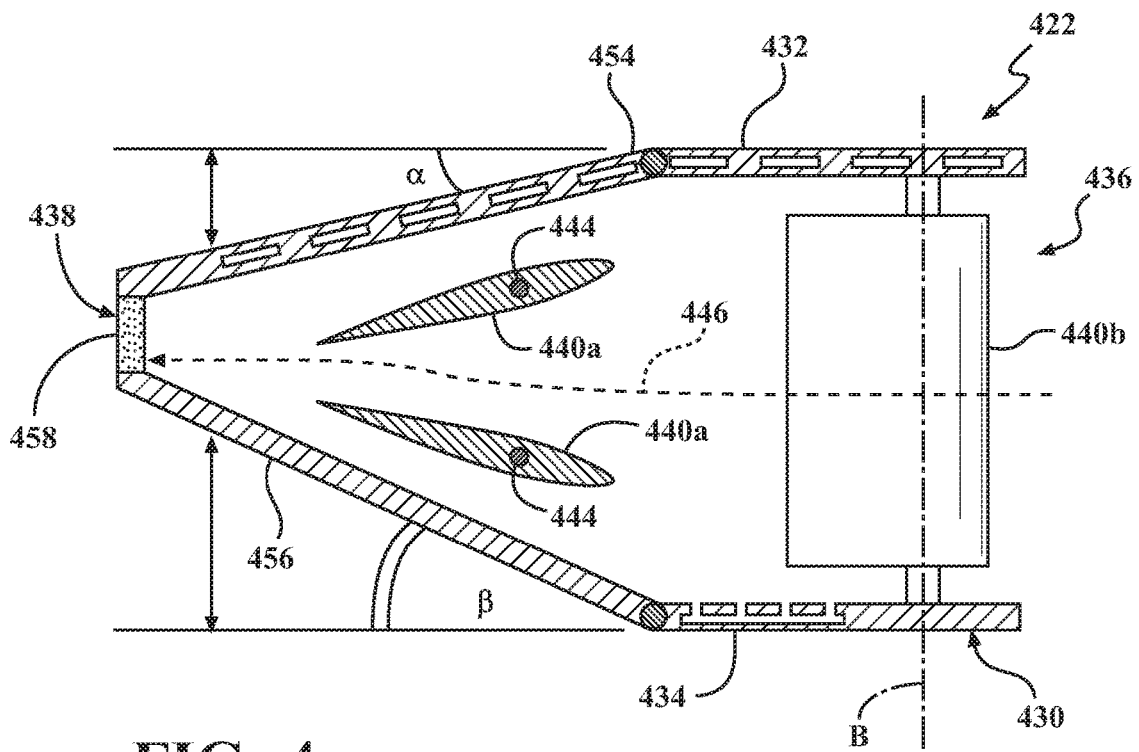
FIG. 4 shows another vertical sectional view through section 3-3 of the slit-vent fluid delivery module of FIG. 2.

FIG. 4 shows another vertical sectional view through section 3-3 of the slit-vent fluid delivery module 222 of FIG. 2. In the FIG. 4 example, the slit-vent fluid delivery module 422 includes a housing 430 having a top surface 432 and a bottom surface 434 defining a fluid flow path 446 generally designated using a dotted line between an inlet 436 and an outlet 438. Two types of fluidic control devices 440a-b are disposed within the housing 430, the transverse fluidic control devices 440a having an airfoil shape and rotatable about pivots 444 and the vertical fluidic control device 440b extending between the top surface 332 and the bottom surface 334 and rotatable about an axis B. The fluidic control devices 440a-b operate in a manner similar to that described in respect to the fluidic control devices 340a-b of FIG. 3.

The slit-vent fluid delivery module 422 of FIG. 4 can also include a top surface portion 454 and a bottom surface portion 456, both of which are movable to alter a cross-sectional area of the outlet 438. The top surface portion 454 is shown as rotated at an angle α in respect to the top surface 432. The bottom surface portion 456 is shown as rotated at an angle β in respect to the bottom surface 434. Though shown as slightly different angles in FIG. 4, the angles α and β can be equal, can differ slightly, or can differ greatly depending on the fluid delivery profile being executed by the slit-vent fluid delivery module 422. The ECU 104 can be used to modify the angle α and/or the angle β to change the fluid flow path 446 to meet a specific fluid delivery profile.

The slit-vent fluid delivery module 422 can also include an outlet treatment such as a porous material 458 that both hides visibility of the outlet 438 and implements various fluid delivery profiles. For example, the porous material 458 can be controlled in order to change the characteristics of the fluid flow exiting the outlet 438, for example, to restrict the flow, to change the direction of the flow, or to oscillate the flow to meet a variety of flow patterns corresponding to a variety of fluid delivery profiles. The porous material 458 can also be semi-porous, have variable porosity, have a variety of colors or shadings, and can hide the outlet 438 from view of a user while at the same time only minimally impacting the fluid flow path 446 at the outlet 438. Examples of the porous material 458 include a ferromagnetic fabric with controllable chains, a roller-blind-style cover, and a flexible fabric with openings of varying sizes depending on how taught the fabric is stretched.

Figure 5:
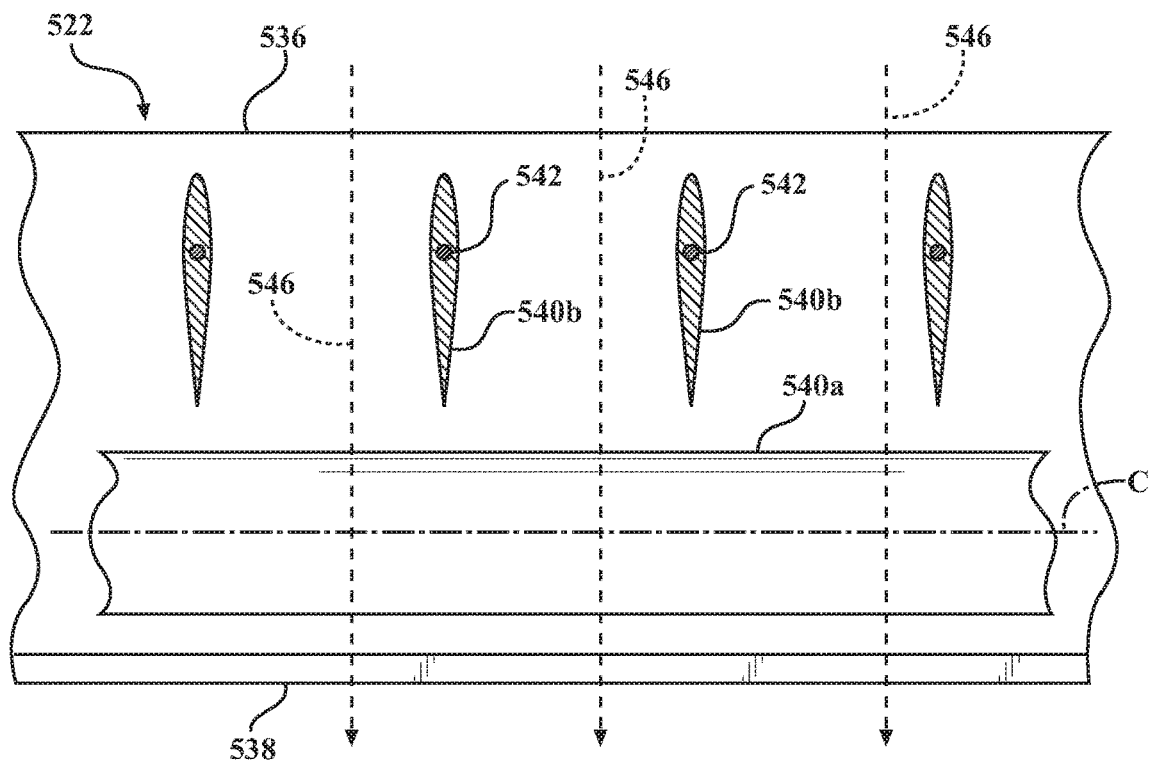
FIG. 5 shows a horizontal sectional view through section 5-5 of the slit-vent fluid delivery module of FIG. 2.

FIG. 5 shows a horizontal sectional view through section 5-5 of the slit-vent fluid delivery module 222 of FIG. 2. In the FIG. 5 example, the slit-vent fluid delivery module 522 extends from an inlet 536 to an outlet 538. Two types of fluidic control devices 540*a*-*b* are disposed between the inlet 536 and the outlet 538, the transverse fluidic control device 540*a* rotatable about axis C and the spaced, vertical fluidic control devices 540*b* having airfoil shapes and rotatable about pivots 542. The fluidic control devices 540*a*-*b* operate in a manner similar to that described in respect to the fluidic control devices 340*a*-*b* of FIG. 3.

With the spaced, vertical fluidic control devices 540*b* oriented in a manner that is generally perpendicular to cross-sectional areas of the inlet 536 and the outlet 538, fluid flow paths 546 can extend between the vertical fluidic control devices 540*b*. Similarly, with the transverse fluidic control device 540*a* oriented in a manner that is also generally perpendicular to the cross-sectional areas of the inlet 536 and the outlet 538, the fluid flow paths 546 can further extend across a surface of the transverse fluidic control device 540*a* as shown. With the fluidic control devices 540*a*-*b* in the shown orientation, the fluid flow paths 546 are generally unobstructed between the inlet 536 and the outlet 538.

Figure 6:
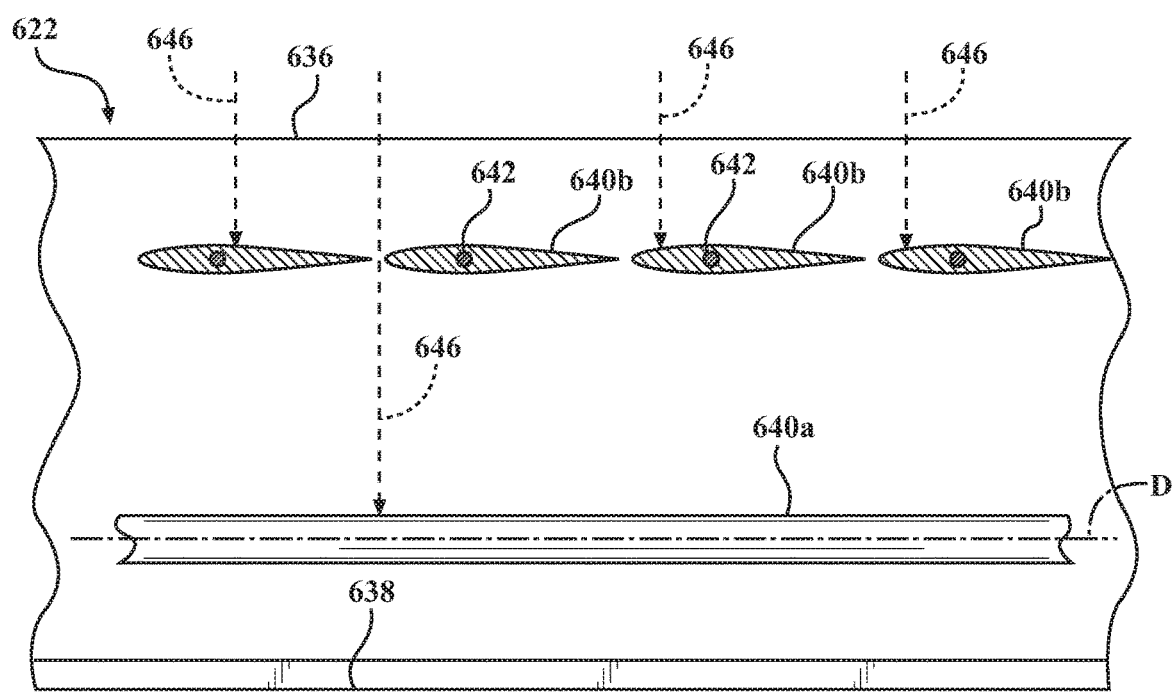
FIG. 6 shows another horizontal sectional view through section 5-5 of the slit-vent fluid delivery module of FIG. 2.

FIG. 6 shows another horizontal sectional view through section 5-5 of the slit-vent fluid delivery module 222 of FIG. 2. The FIG. 6 example is similar to the FIG. 5 example except for the orientation of fluidic control devices 640*a*-*b*. Thus, a slit-vent fluid delivery module 622 extends from an inlet 636 to an outlet 638 and includes the transverse fluidic control device 640*a* rotatable about axis D and the spaced, vertical fluidic control devices 640*b* having airfoil shapes and rotatable about pivots 642. The fluidic control devices 640*a*-*b* operate in a manner similar to that described in respect to the fluidic control devices 340*a*-*b* of FIG. 3.

The spaced, vertical fluidic control devices 640*b* are oriented in a manner that is generally parallel to cross-sectional areas of the inlet 636 and the outlet 638 such that fluid flow paths 646 are generally blocked between the vertical fluidic control devices 640*b*. Similarly, the transverse fluidic control device 640*a* is oriented in a manner that is also generally parallel to the cross-sectional areas of the inlet 636 and the outlet 638 such that any fluid flow paths 646 that manage to extend between the vertical fluidic control devices 640*b* are blocked by the transverse fluidic control device 640*a* as shown. With the fluidic control devices 640*a*-*b* in the described orientations, the fluid flow paths 646 are generally obstructed between the inlet 636 and the outlet 638. These orientations of the fluidic control devices 640*a*-*b* can be employed when a user input dictates that no fluid be delivered from a specific region or zone of the slit-vent fluid delivery module 622.

Figure 7:
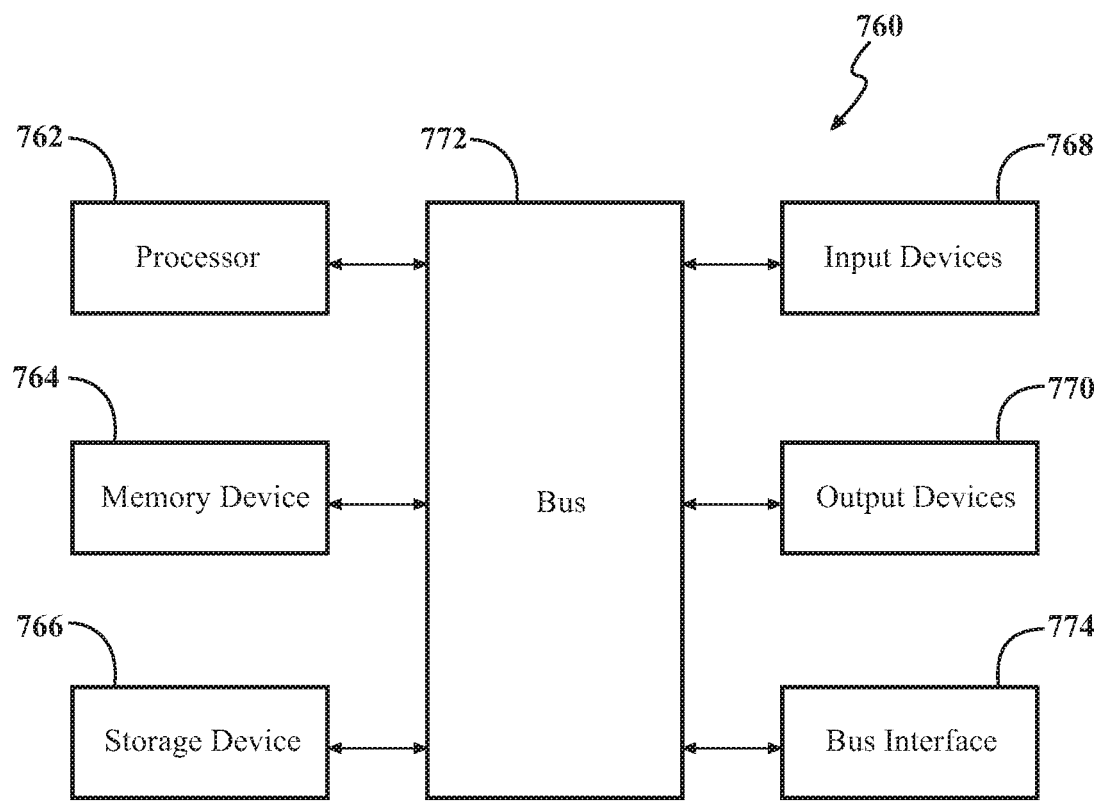
FIG. 7 is a block diagram of an example of a computing device.

FIG. 7 is a block diagram of an example of a computing device 760. The computing device 760 can be a single computing device or a system that includes multiple computing devices working cooperatively. As an example, the computing device 760 could be a vehicle-based computing device such as the ECU 104. Alternatively, the computing device 760 could be a desktop computer, a laptop computer, a tablet, or a mobile device such as a smart phone.

In the illustrated example, the computing device 760 includes a processor 762, a memory device 764, a storage device 766, one or more input devices 768, and one or more output devices 770 which are interconnected by a bus 772. The computing device 760 can also include a bus interface 774 for connecting peripheral devices to the bus 772.

The processor 762 can be any type of device that is able to process or manipulate information, including devices that are currently known and devices that may be developed in the future. As an example, the processor 762 can be a conventional central processing unit (CPU). Although the illustrated example shows a single processor, multiple processors can be used instead of a single processor.

The memory device 764 can be used to store information for immediate use by the processor 762. The memory device 764 includes either or both of a random access memory (RAM) device and a read only memory (ROM) device. The memory device 764 can be used to store information, such as program instructions that can be executed by the processor 762, and data that is stored by and retrieved by the processor 762. In addition, portions of the operating system of the computing device 760 and other applications that are being executed by the computing device 760 can be stored by the memory device during operation of the computing device 760.

The storage device 766 can be used to store large amounts of data persistently. As examples, the storage device 766 can be a hard disk drive or a solid state drive.

The input devices 768 can include any type of device that is operable to generate computer interpretable signals or data in response to user interaction with the computing device 760, such as physical interaction, verbal interaction, or non-contacting gestural interaction. As examples, the input devices 768 can include one or more of a keyboard, a mouse, a touch-sensitive panel with or without an associated display, a trackball, a stylus, a microphone, a camera, or a three-dimensional motion capture device.

The output devices 770 can include any type of device that is able to relay information in a manner that can be perceived by a user. As examples, the output devices 770 can include one or more of an LCD display screen, an LED display screen, a CRT display screen, a printer, an audio output device such as a speaker, or a haptic output device. In some implementations, the output devices 770 include a display screen and the input devices 768 include a touch sensitive panel that is integrated into the display screen to define a touch-sensitive display screen.

The bus 772 transfers signals and/or data between the components of the computing device 760. Although depicted as a single bus, it should be understood that multiple or varying types of buses can be used to interconnect the components of the computing device 760. The bus interface 774 can be any type of device that allows other devices, whether internal or external, to connect to the bus 772. In one implementation, the bus interface 774 allows connection to a controller area network (CAN) bus of a vehicle.

What is claimed is:

1. A fluid delivery module, comprising:
   a housing defining a fluid flow path between an inlet and an outlet, wherein a width of the outlet is at least an order of magnitude greater than a height of the outlet, and wherein a cross-sectional area of the inlet is at least an order of magnitude greater than a cross-sectional area of the outlet;
   a fluidic control device disposed within the housing between the inlet and the outlet and movable to vary a direction of the fluid flow path within the housing, wherein the fluidic control device is spaced from the outlet such that movement of the fluidic control device is blocked from view of a user positioned at a location outside the housing;
   a shutter device extending at least partially across the outlet and positionally controllable to vary the cross-sectional area of the outlet, wherein varying the cross-sectional area of the outlet generates oscillations or bursts of fluid flow from the outlet; and
   a control unit controlling movement of the fluidic control device and the shutter device.

2. The module of claim 1, wherein the fluidic control device is movable to modify or block the fluid flow path between the inlet and the outlet in a portion or zone of the housing and wherein the portion or zone is less than an entirety of the housing.

3. The module of claim 1, wherein the control unit controls movement of the fluidic control device and the shutter device based on an input received from a mobile device associated with a user.

4. The module of claim 3, wherein the input defines a fluid delivery profile, wherein the fluidic control device and the shutter device are controlled to move according to the fluid delivery profile, and wherein the fluid delivery profile dictates flow pattern, speed, temperature, humidity, scent, or type of a fluid being delivered to the user by the fluid delivery module.

5. The module of claim 4, further comprising:
   an olfactory passage defined within the housing between the inlet and the outlet that delivers scented fluid to the fluid flow path according to the fluid delivery profile.

6. The module of claim 4, further comprising:
   a thermal passage defined within the housing between the inlet and the outlet that carries thermally conditioned working fluid that heats or cools the fluid flow along the fluid flow path according to the fluid delivery profile.

7. The module of claim 1, wherein the housing comprises opposing side surfaces, and wherein the fluidic control device extends from a first side surface of the housing to a second side surface of the housing.

8. The module of claim 7, wherein the fluidic control device is a transverse fluidic control device having an airfoil shape, and wherein the transverse fluidic control device is configured to provide a fine level of directional control to fluid moving along the fluid flow path, the module comprising:
   a vertical fluidic control device disposed within the housing between the inlet and the transverse fluidic control device that is movable to vary a direction of the fluid flow path within the housing and configured to provide a coarse level of directional control to fluid flow along the fluid flow path.

9. The module of claim 1, further comprising:
   an outlet treatment disposed proximate to the outlet, wherein the outlet treatment comprises a porous material covering the outlet, wherein the porous material comprises at least one of a ferromagnetic fabric, a roller-blind cover, or a flexible fabric with openings that vary in size based on stretch of the flexible fabric, and wherein the outlet treatment blocks visibility of the outlet from the user positioned at the location outside the housing.

10. A climate-control method, comprising:
    receiving, at a control unit, information associated with a fluid delivery profile based on a user input, wherein the fluid delivery profile dictates a flow pattern having semi-random, sinusoidal, or oscillating directional changes in fluid flow exiting an outlet of a fluid delivery module; and
    sending, from the control unit, a command to modify movement of a top surface portion or a bottom surface portion of the fluid delivery module based on the fluid delivery profile,
    wherein the fluid delivery module includes an outlet treatment formed of a porous material covering the outlet and extending between the top surface portion and the bottom surface portion of the fluid delivery module, and
    wherein the flow pattern is achieved based on movement of the top surface portion or the bottom surface portion that modifies a cross-sectional area of the outlet and stretches the porous material to achieve the flow pattern according to the fluid delivery profile.

11. The method of claim 10, wherein a width of the outlet is at least an order of magnitude greater than a height of the outlet.

12. The method of claim 10, wherein the user input is received at a mobile device in communication with the control unit.

13. The method of claim 10, wherein the fluid delivery profile dictates speed, temperature, humidity, scent, or type of a fluid being delivered to the user by the fluid delivery module.

14. The method of claim 10, wherein the fluid delivery module includes an olfactory passage that delivers scented fluid to the fluid flow according to the fluid delivery profile.

15. The method of claim 10, wherein the fluid delivery module includes a thermal passage that carries thermally conditioned working fluid that heats or cools the fluid flow along the fluid flow according to the fluid delivery profile.

16. A fluid delivery module, comprising:
    a housing defining a fluid flow path between an inlet and an outlet;
    a fluidic control device disposed within the housing between the inlet and the outlet and movable according to commands from a control unit to vary a direction of the fluid flow path within the housing according to a fluid delivery profile,
    wherein the fluid delivery profile dictates a flow pattern of fluid flow along the fluid flow path,
    wherein the flow pattern includes one or more of semi-random, oscillating, or sinusoidal direction changes in the fluid flow moving from the inlet along the fluid flow path before exiting the outlet, and
    wherein the flow pattern is achieved based on motion of the fluidic control device according to the commands; and an outlet treatment movable according to the commands from the control unit to change characteristics of the fluid flow exiting the outlet according to the fluid delivery profile,
wherein the outlet treatment comprises a porous material extending between surface portions of the housing and covering the outlet, and
wherein the flow pattern is achieved based on moving at least one of the surface portions of the housing and stretching the porous material according to the commands from the control unit.

17. The module of claim 16, further comprising:
an olfactory passage defined within the housing between the inlet and the outlet that delivers scented fluid to the fluid flow path according to the fluid delivery profile.

18. The module of claim 16, further comprising:
a thermal passage defined within the housing between the inlet and the outlet that carries thermally conditioned working fluid that heats or cools the fluid flow along the fluid flow path according to the fluid delivery profile.

19. The module of claim 16, wherein the first fluidic control device is spaced from the outlet such that movement of the first fluidic control device is blocked from view of a user positioned at a location outside a housing of the fluid delivery module.

20. The module of claim 16, wherein the fluid delivery profile dictates speed, temperature, humidity, scent, or type of a fluid being delivered to thea user by the fluid delivery module.

\* \* \* \* \*

UNITED STATES PATENT AND TRADEMARK OFFICE
CERTIFICATE OF CORRECTION

PATENT NO. : 10,752,082 B1
APPLICATION NO. : 15/606179
DATED : August 25, 2020
INVENTOR(S) : John M. Kearney et al.

Page 1 of 1

It is certified that error appears in the above-identified patent and that said Letters Patent is hereby corrected as shown below:

In the Claims

At Column 11, Claim number 20, Line number 28, "delivered to thea user" should be --delivered to a user--.

Signed and Sealed this
Twenty-seventh Day of October, 2020

Andrei Iancu
*Director of the United States Patent and Trademark Office*